US012566082B2

(12) United States Patent
Loeken et al.

(10) Patent No.: US 12,566,082 B2
(45) Date of Patent: Mar. 3, 2026

(54) CAPACITIVE ANGLE-OF-ROTATION MEASUREMENT SYSTEM AND METHOD FOR ADAPTING A CAPACITIVE ANGLE-OF-ROTATION MEASUREMENT SYSTEM

(71) Applicant: FRABA B.V., Sg Heerlen (NL)

(72) Inventors: Michael Loeken, Juelich (DE); Hanno Volker, Aachen (DE)

(73) Assignee: FRABA B.V., Sg Heerlen (NL)

( * ) Notice: Subject to any disclaimer, the term of this patent is extended or adjusted under 35 U.S.C. 154(b) by 258 days.

(21) Appl. No.: 18/032,194

(22) PCT Filed: Oct. 19, 2020

(86) PCT No.: PCT/EP2020/079391
§ 371 (c)(1),
(2) Date: Apr. 17, 2023

(87) PCT Pub. No.: WO2022/083846
PCT Pub. Date: Apr. 28, 2022

(65) Prior Publication Data
US 2023/0392961 A1      Dec. 7, 2023

(51) Int. Cl.
*G01D 5/241*          (2006.01)
*G01B 7/30*           (2006.01)
*G01D 5/24*           (2006.01)

(52) U.S. Cl.
CPC .............. *G01D 5/241* (2013.01); *G01B 7/30* (2013.01); *G01D 5/2403* (2021.05); *G01D 5/2405* (2013.01)

(58) Field of Classification Search
CPC ........ G01B 7/30; G01D 5/241; G01D 5/2403; G01D 5/2405
See application file for complete search history.

(56) References Cited

U.S. PATENT DOCUMENTS

| | | | |
|---|---|---|---|
| 2014/0139243 A1 | 5/2014 | Francescon | |
| 2017/0115136 A1 | 4/2017 | Kurte et al. | |
| 2019/0011291 A1 | 1/2019 | Parupalli | |

FOREIGN PATENT DOCUMENTS

| | | | | |
|---|---|---|---|---|
| DE | 10 2011 087 493 A1 | 6/2013 | | |
| DE | 102011087494 A1 * | 6/2013 | ........... | G01D 5/2415 |
| DE | 10 2014 224 222 A1 | 1/2016 | | |

* cited by examiner

*Primary Examiner* — Amy He
(74) *Attorney, Agent, or Firm* — Norman B. Thot

(57) ABSTRACT

A capacitive rotary angle measuring system for detecting a rotary movement of a shaft includes a sensor unit, a carrier signal generator, an evaluation unit, and a carrier signal adaptation unit. The sensor unit includes a transmitting electrode arrangement and a receiving electrode arrangement which are capacitively coupled together, and a coupling device which co-rotates with the shaft and which varies an electric capacity between the receiving and the transmitting electrode arrangement based on a rotational position of the coupling device. The carrier signal generator is electrically connected to the transmitting electrode arrangement and generates an electrical carrier signal. The evaluation unit is electrically connected to the receiving electrode arrangement and senses an electric measurement signal generated at the receiving electrode arrangement and determines a current rotary angle measurement value. The carrier signal adaptation unit adapts a carrier signal frequency value based on a provided interference frequency value.

2 Claims, 2 Drawing Sheets

CAPACITIVE ANGLE-OF-ROTATION MEASUREMENT SYSTEM AND METHOD FOR ADAPTING A CAPACITIVE ANGLE-OF-ROTATION MEASUREMENT SYSTEM

CROSS REFERENCE TO PRIOR APPLICATIONS

This application is a U.S. National Phase application under 35 U.S.C. § 371 of International Application No. PCT/EP2020/079391, filed on Oct. 19, 2020. The International Application was published in German on Apr. 28, 2022 as WO 2022/083846 A1 under PCT Article 21(2).

FIELD

The present invention relates to a capacitive rotary angle measuring system for detecting a rotary movement of a shaft. The capacitive rotary angle measuring system comprises a capacitive sensor unit having a transmitting electrode arrangement, a receiving electrode arrangement which is capacitively coupled to the transmitting electrode arrangement, and a rotatable coupling device which is mountable to rotate with the shaft and which is configured to change the electric capacity between the receiving electrode arrangement and the transmitting electrode arrangement depending on the rotational position of the coupling device, a carrier signal generator which is electrically connected to the transmitting electrode arrangement and which is configured to generate an electrical carrier signal with a carrier signal frequency predetermined by a carrier signal frequency value and to apply it to the transmitting electrode arrangement, and an evaluation unit which is electrically connected to the receiving electrode arrangement and which is configured to generate a carrier signal with a carrier signal frequency predetermined by a carrier signal frequency value and to apply it to the transmitting electrode arrangement, tapping an electric measurement signal generated by applying the carrier signal to the transmitting electrode arrangement of the capacitive sensor unit at the receiving electrode arrangement of the capacitive sensor unit, and determining a current rotation angle measurement value by evaluating the measurement signal. The present invention is further directed to a method for adapting a capacitive rotary angle measuring system.

BACKGROUND

Such capacitive rotary angle measuring systems have previously been described, for example, in EP 2 733 468 A1, and are often also referred to as capacitive angle measuring devices, capacitive rotary angle sensors, or capacitive rotary encoders. Such systems are in particular used for controlling and monitoring electric motors, in particular servomotors, in machines, systems or vehicles. Capacitive rotary angle measuring systems are in particular characterized by contact-free and thus wear-free sensor technology, which allows for a long service life.

Capacitive rotary angle measuring systems of this type typically operate with a carrier signal frequency in the low kHz range, for example, with a carrier signal frequency of 25 kHz. PWM signal generators that generate a pulse-width modulated PWM signal with a defined PWM signal frequency, however, also typically operate in this frequency range. Such PWM signal generators are commonly used in electric motors for the electronic control of a drive power.

Typical PWM signal frequencies used in electric motors are, for example, 4 kHz or 8 kHz. A harmonic of these typical PWM signals is 24 kHz, which is close to the typical carrier signal frequency of 25 kHz.

When typical capacitive rotary angle measuring systems are used to monitor electric motors, the PWM signal used to control the drive power, or its harmonics, can generate significant signal noise in the measurement signal of the rotary angle measuring system. The signal noise in the measurement signal can in turn significantly affect the accuracy and reliability of the capacitive rotary angle measuring systems.

SUMMARY

An aspect of the present invention is to provide a reliable and versatile capacitive rotary angle measuring system.

In an embodiment, the present invention provides a capacitive rotary angle measuring system for detecting a rotary movement of a shaft. The capacitive rotary angle measuring system includes a capacitive sensor unit, a carrier signal generator, an evaluation unit, and a carrier signal adaptation unit. The capacitive sensor unit comprises a transmitting electrode arrangement, a receiving electrode arrangement which is capacitively coupled to the transmitting electrode arrangement, and a rotatable coupling device which is co-rotatably mountable with the shaft and which is configured to vary an electric capacity between the receiving electrode arrangement and the transmitting electrode arrangement in response to a rotational position of the rotatable coupling device. The carrier signal generator is electrically connected to the transmitting electrode arrangement and is configured to generate an electrical carrier signal with a carrier signal frequency which is specified by a carrier signal frequency value and to apply the electrical carrier signal to the transmitting electrode arrangement. The evaluation unit is electrically connected to the receiving electrode arrangement and is configured to sense an electric measurement signal generated at the receiving electrode arrangement by applying the electrical carrier signal to the transmitting electrode arrangement and to determine a current rotary angle measurement value by evaluating the electric measurement signal. The carrier signal adaptation unit is provided with an interference frequency value during an operation and is configured to adapt the carrier signal frequency value based on the interference frequency value.

BRIEF DESCRIPTION OF THE DRAWINGS

The present invention is described in greater detail below on the basis of embodiments and of the drawings in which.

DETAILED DESCRIPTION

Figure 1:
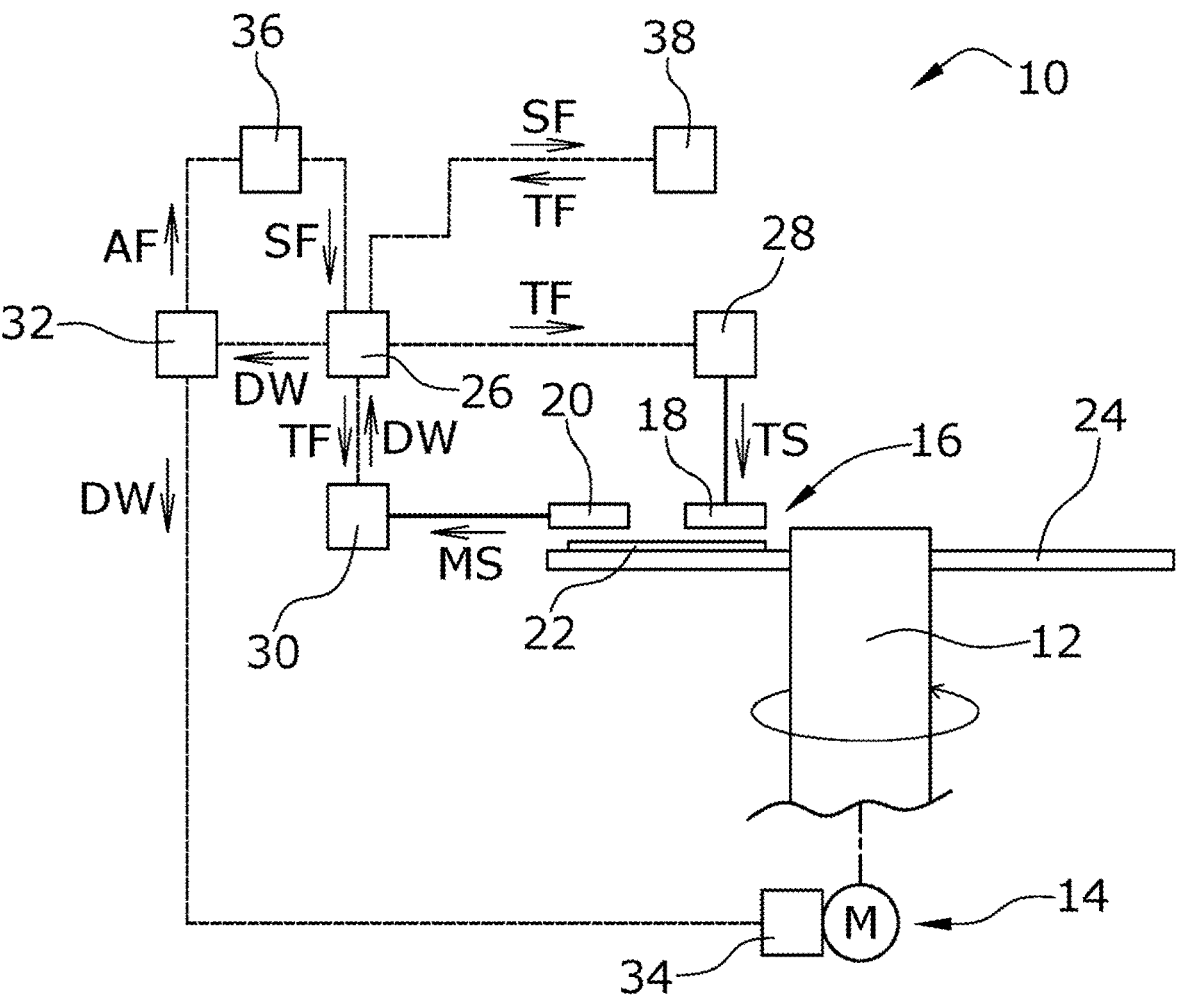
FIG. 1 shows a schematic representation of a capacitive rotary angle measuring system according to the present invention which is arranged at a shaft driven by an electric motor.

The present invention provides a carrier signal adaptation unit which is provided with an interference frequency value during operation of the rotary angle measuring systems and which is configured to adapt the carrier signal frequency value specifying the carrier signal frequency based on the interference frequency value. The interference frequency value is typically provided to the carrier signal adaptation unit via a data storage to which the carrier signal adaptation unit has access and in which the interference frequency value is stored. The interference frequency value can, for example, be written to the data storage during the course of initialization prior to commissioning of the rotary angle measuring system or during maintenance of the rotary angle measuring system, or it can be provided in some other way. Automatic determination and provision of the interference frequency value during operation of the rotary angle measuring systems may alternatively be provided.

The interference frequency value may, for example, correspond to the PWM signal frequency of an electric motor to be monitored by the rotary angle measuring system. The interference frequency value may, however, also refer to the frequency of any other interference signal typically present in the operation of the rotary angle measuring systems. The carrier signal adaptation unit may also be provided with a plurality of interference frequency values or even an interference frequency band, wherein the carrier signal adaptation unit is in this case configured to adapt the carrier signal frequency value based on the plurality of interference frequency values or on the interference frequency band, respectively.

The carrier signal adaptation unit is in particular configured to adapt the carrier signal frequency value so that the carrier signal frequency value is not equal to the interference frequency value and is, for example, also not equal to all integer multiples of the interference frequency value. This minimizes an expected interference influence by an interference signal with an interference frequency value predetermined by the interference frequency value. The carrier signal adaptation unit according to the present invention furthermore allows for an easy adaptation of the rotary angle measuring system to different applications with different interference signals, thus providing a reliable and versatile capacitive rotary angle measuring system.

An interference frequency detection unit can, for example, be provided that is configured to automatically determine an interference frequency value and to provide the determined interference frequency value to the carrier signal adaptation unit. The interference frequency detection unit can, for example, be configured to use an antenna device to detect potentially present interference radiation and to determine the interference frequency value based on the frequency of the acquired interference radiation. Automatic determination of the interference frequency value allows for an automatic adaptation of the rotary angle measuring system to interference sources present at the installation site. The interference frequency detection unit according to the present invention thus provides a particularly reliable and versatile rotary angle measuring system.

Rotary angle measurement systems typically comprise a data interface via which the current rotary angle measurement value can be read out by an external readout device, for example, a motor control of an electric motor. The motor control and PWM signal generator in electric motors often operate at a common clock rate so that a readout frequency at which the current rotary angle measurement value is read out from the rotary angle measuring system by the motor control via the data interface during operation typically corresponds at least approximately to a PWM signal frequency of a PWM signal generated by the PWM signal generator.

In an embodiment of the present invention, the interference frequency detection unit can, for example, therefore be connected to the data interface and be configured to detect the readout frequency at which the current rotary angle measurement value can be read out via the data interface. The interference frequency detection unit is further configured to determine the interference frequency value based on the acquired readout frequency, wherein the determined interference frequency value can, for example, be equal to the acquired readout frequency. The interference frequency detection unit can alternatively also be configured to determine the interference frequency value via a mathematical formula or via a stored map based on the acquired readout frequency. The interference frequency detection unit is further configured to provide the determined interference frequency value to the carrier signal adaptation unit. The interference frequency detection unit may, for example, be configured to write the determined interference frequency value to a data storage that is accessible to the carrier signal adaptation unit. The interference frequency detection unit according to the present invention allows for an automatic determination of the interference frequency value during operation of the rotary angle measuring system, thus providing a particularly reliable and versatile rotary angle measuring system.

The method according to the present invention for adapting a capacitive rotary angle measuring system comprises the following method steps:

Providing an interference frequency value;

Determining a carrier signal frequency value based on the interference frequency value;

Providing the carrier signal frequency value to a carrier signal generator;

Generating an electric carrier signal having a carrier signal frequency predetermined by the carrier signal frequency value by the carrier signal generator;

Applying the carrier signal to a transmitting electrode arrangement of a capacitive sensor unit; and Evaluating an electric measurement signal generated by applying the carrier signal to the transmitting electrode arrangement at a receiving electrode arrangement of the capacitive sensor unit to determine a current rotary angle measurement value.

Providing the interference frequency value is typically performed by writing the interference frequency value into a corresponding data storage. An interference frequency detection unit can, for example, be provided for determining the interference frequency value, which allows for an automatic determination of the interference frequency value during operation of the rotary angle measuring systems. The interference frequency value can alternatively also be provided manually, for example, in the course of initialization or maintenance of the rotary angle measurement system.

A carrier signal adaptation unit according to the present invention described above can, for example, be provided for determining the carrier signal frequency value, which is configured to determine a carrier signal frequency value for which an interference influence to be expected due to an interference signal with an interference signal frequency predetermined by the interference frequency value is as low as possible. The determined carrier signal frequency value is in particular not equal to the interference frequency value and can, for example, also not be equal to all integer multiples of the interference frequency value.

The present invention provides that the determined carrier signal frequency value is provided to a carrier signal generator which generates an electric carrier signal having a carrier signal frequency which is predetermined by the carrier signal frequency value. The carrier signal frequency value is typically written to a data storage that is accessible to the carrier signal generator.

The carrier signal is applied to the transmitting electrode arrangement of a conventional capacitive sensor unit known in the prior art. This generates a measurement signal at the receiving electrode arrangement of the capacitive sensor unit from which a current rotary angle measurement value is determined via previously described evaluation arrangements/procedures.

Via the method according to the present invention, a carrier signal is generated by the carrier signal generator, which comprises a carrier signal frequency that allows interference-free and reliable rotational angle measurement. The method according to the present invention also allows for an easy adaptation of the rotary angle measuring systems to different applications with different interference signals.

The method according to the present invention for adapting a capacitive rotary angle measuring system further advantageously comprises the following method steps:

Acquiring a readout frequency at which a current rotary angle measurement value is read out via a data interface of the rotary angle measuring systems; and Determining an interference frequency value based on the acquired readout frequency.

The determined interference frequency value can, for example, be equal to the acquired readout frequency. The interference frequency value can alternatively also be determined via a mathematical formula or via a stored characteristic map based on the acquired readout frequency. This allows for an automatic determination of the interference frequency value during operation of the rotary angle measuring systems, as already described above.

Two embodiments of a capacitive rotary angle measuring system according to the present invention for detecting a rotary movement of a shaft are described below with reference to the accompanying drawings.

FIG. 1 shows a capacitive rotary angle measuring system 10 arranged on a shaft 12 driven by an electric motor 14.

The capacitive rotary angle measuring system 10 comprises a capacitive sensor unit 16 having a transmitting electrode arrangement 18, a receiving electrode arrangement 20, and a rotatable coupling device 22. The transmitting electrode arrangement 18 and the receiving electrode arrangement 20 are stationarily arranged, for example, on a housing or on a stator unit of the capacitive rotary angle measuring system 10, and respectively comprise one or more typically metallic electrodes. In the present embodiment, the coupling device 22 is arranged on a rotor disc 24 that is fixedly attached to the shaft for rotation therewith. The receiving electrode arrangement 20 is capacitively coupled to the transmitting electrode arrangement 18 via the coupling device 22, wherein the capacitive sensor unit 16 (as known from the prior art) is configured so that the electric capacity measurable between the receiving electrode arrangement 20 and the transmitting electrode arrangement 18 changes depending on the current rotational position of the coupling device 22.

The capacitive rotation angle measuring system 10 comprises a data storage 26 in which at least an interference frequency value SF, a carrier signal frequency value TF, and a current rotary angle measurement value DW, can be stored.

The capacitive rotary angle measuring system 10 includes a carrier signal generator 28 which is electrically connected to the transmitting electrode arrangement 18 and which has access to the data storage 26. The carrier signal generator 28 is configured to read the carrier signal frequency value TF from the data storage and to generate and apply an electric carrier signal TS having a carrier signal frequency predetermined by the carrier signal frequency value TF to the transmitting electrode arrangement 18. As is known from the prior art, by applying the carrier signal TS to the transmitting electrode arrangement 18, a measurement signal MS dependent on the current rotational position of the coupling device 22 is generated at the receiving electrode arrangement 20.

The capacitive rotary angle measuring system 10 comprises an evaluation unit 30 which is electrically connected to the receiving electrode arrangement 20 and which has access to the data storage 26. The evaluation unit 30 is configured to receive and to evaluate the measurement signal MS generated at the receiving electrode arrangement 20. The evaluation unit 30 is in particular configured to determine the current rotary angle measurement value DW, which indicates the current rotational position of the coupling device 22 and thus the current rotation angle of the shaft 12, by evaluating the measurement signal MS. The evaluation unit 30 is further configured to write the determined current rotary angle measurement value DW to the data storage 26.

The capacitive rotary angle measuring system 10 comprises a data interface 32 which has access to the data storage 26. The data storage 26 is externally readable and writable via the data interface 32. In the present embodiment, the data interface 32 provides a data connection to a motor control unit 34 of the electric motor 14, via which the motor control unit 34 periodically reads out the current rotary angle measurement value DW.

In the present embodiment, the capacitive rotary angle measuring system 10 comprises an interference frequency detection unit 36 which is connected to the data interface 32 and which has access to the data storage 26. The interference frequency detection unit 36 is configured to detect a readout frequency AF with which the current rotary angle measurement value DW is read out from the motor control unit 34 via the data interface 32. The interference frequency detection unit 36 is further configured to determine the interference frequency value SF based on the readout frequency AF, and to write the determined interference frequency value SF to the data storage 26. In the present case, the determined interference frequency value SF indicates the readout frequency AF. It is also possible, however, that the interference frequency value SF is determined based on the readout frequency AF via a defined mathematical formula or via a stored characteristic diagram.

It is also possible, however, to have a rotary angle measuring system that does not require an interference frequency detection unit. The interference frequency value can, for example, be written to the data storage during initialization or during maintenance of the rotary angle measuring systems by an external programming device via the data interface.

The capacitive rotary angle measuring system 10 includes a carrier signal adaptation unit 38 that has access to the data storage 26. The carrier signal adaptation unit 38 is configured to read the interference frequency value SF from the data storage 26 and to adapt the carrier signal frequency value TF stored in the data storage 26 based on the interference frequency value SF. The carrier signal adaptation unit 38 is specifically configured to determine a carrier signal frequency value TF that is not equal to the interference frequency value SF and not equal to all integer multiples of the interference frequency value SF and to write the determined carrier signal frequency value TF to the data storage 26.

In operation, the motor control unit 34 periodically reads out the current rotary angle measurement value DW via the data interface 32, wherein the interference frequency detection unit 36 acquires the readout frequency AF.

The interference frequency detection unit 36 determines the interference frequency value SF based on the readout frequency AF, and writes the determined interference frequency value SF to the data storage 26.

The carrier signal adaptation unit 38 reads the determined interference frequency value SF from the data storage 26, determines the carrier signal frequency value TF based on the interference frequency value SF, and writes the determined carrier signal frequency value TF to the data storage 26.

The carrier signal generator 28 reads the carrier signal frequency value TF determined from the data storage 26, generates the carrier signal TS with the carrier signal frequency specified by the carrier signal frequency value TF, and applies the carrier signal TS to the transmitting electrode arrangement 18 of the capacitive sensor unit 16.

The evaluation unit 30 reads the carrier signal frequency value TF from the data storage and senses the measurement signal MS generated at the receiving electrode arrangement 20 of the capacitive sensor unit 16. The evaluation unit 30 evaluates the measurement signal MS based on the carrier signal frequency value TF to determine the current rotary angle measurement value DW, and writes the determined current rotary angle measurement value DW to the data storage 26.

Figure 2:
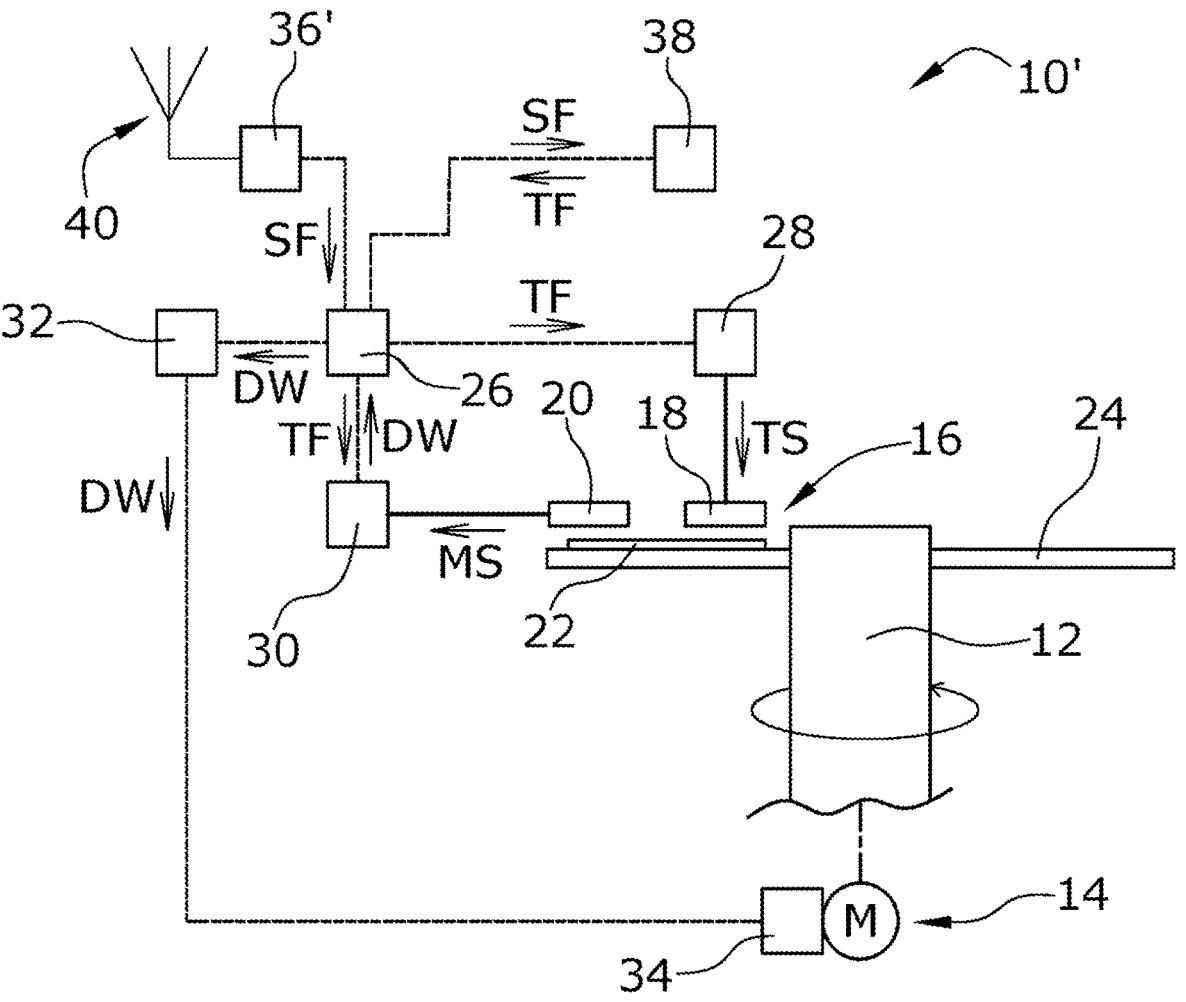
FIG. 2 shows a schematic representation of an alternative capacitive rotary angle measuring system according to the present invention.

FIG. 2 shows an alternative capacitive rotary angle measuring system 10' according to the present invention.

The capacitive rotary angle measuring system 10' of FIG. 2 differs from the capacitive rotary angle measuring system 10 of FIG. 1 by an alternative interference frequency detection unit 36' having an antenna device 40.

The interference frequency detection unit 36' is configured to detect potentially present interference radiation via the antenna device 40 and to determine the frequency of the interference radiation.

The interference frequency detection unit 36' determines the interference frequency value SF based on the frequency of the acquired interference radiation and writes this to the data storage 26.

The present invention is not limited to embodiments described herein; reference should be had to the appended claims.

LIST OF REFERENCE SIGNS

10;10' Capacitive rotary angle measuring system
12 Shaft
14 Electric motor
16 Capacitive sensor unit
18 Transmitting electrode arrangement
20 Receiving electrode arrangement
22 Coupling device
24 Rotor disc
26 Data storage
28 Carrier signal generator
30 Evaluation unit
32 Data interface
34 Motor control unit
36;36' Interference frequency detection unit
38 Carrier signal adaptation unit
40 Antenna device
AF Readout frequency
DW Current rotary angle measurement value MS Measurement signal
SF Interference frequency value
TF Carrier signal frequency value
TS Carrier signal

What is claimed is:

1. A capacitive rotary angle measuring system for detecting a rotary movement of a shaft, the capacitive rotary angle measuring system comprising:
a capacitive sensor unit comprising,
a transmitting electrode arrangement,
a receiving electrode arrangement which is capacitively coupled to the transmitting electrode arrangement, and
a rotatable coupling device which is co-rotatably mountable with the shaft and which is configured to vary an electric capacity between the receiving electrode arrangement and the transmitting electrode arrangement in response to a rotational position of the rotatable coupling device;
a carrier signal generator which is electrically connected to the transmitting electrode arrangement and which is configured to generate an electrical carrier signal with a carrier signal frequency which is specified by a carrier signal frequency value and to apply the electrical carrier signal to the transmitting electrode arrangement;
an evaluation unit which is electrically connected to the receiving electrode arrangement and which is configured to sense an electric measurement signal generated at the receiving electrode arrangement by applying the electrical carrier signal to the transmitting electrode arrangement and to determine a current rotary angle measurement value by evaluating the electric measurement signal;
a carrier signal adaptation unit which is provided with an interference frequency value via a data storage during an operation and which is configured to adapt the carrier signal frequency value based on the interference frequency value;
an interference frequency detection unit which is configured to automatically determine the interference frequency value and to provide the interference frequency value determined to the carrier signal adaptation unit; and
a data interface which is configured so that the current rotary angle measurement value can be read out via an external readout device,
wherein,
the interference frequency detection unit is connected to the data interface and is further configured,
to detect a readout frequency with which the current rotary angle measurement value is read out via the data interface, and
to determine the interference frequency value based on the readout frequency which is detected.

2. A method for adapting a capacitive rotary angle measuring system, the method comprising:
providing an interference frequency value by writing the interference value into a data storage;
determining a carrier signal frequency value based on the interference frequency value;
providing the carrier signal frequency value to a carrier signal generator;
generating, via the carrier signal generator, an electric carrier signal which has a carrier signal frequency defined by the carrier signal frequency value;
applying the electric carrier signal to a transmitting electrode arrangement of a capacitive sensor unit;

evaluating an electric measurement signal which is generated by applying the electric carrier signal to the transmitting electrode arrangement at a receiving electrode arrangement of the capacitive sensor unit in order to determine a current rotary angle measurement value;

detecting a readout frequency with which the current rotary angle measurement value is read out via a data interface of the rotary angle measuring system, the data interface being configured so that the current rotary angle measurement value is read out via an external readout device; and determining an interference frequency value based on the readout frequency which is detected.

* * * * *